Nov. 15, 1966  E. A. WENDLANDT  3,284,932
SHRUB AND TREE BALLING AND TRANSPLANTING IMPLEMENT
Filed Dec. 7, 1964  2 Sheets-Sheet 1
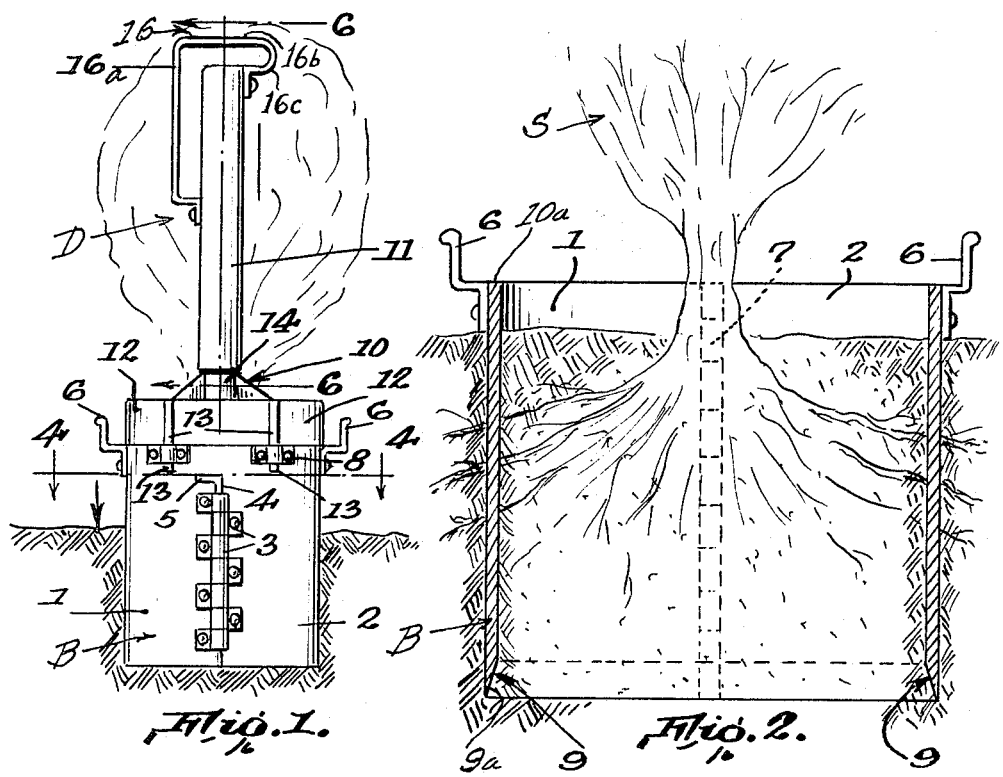
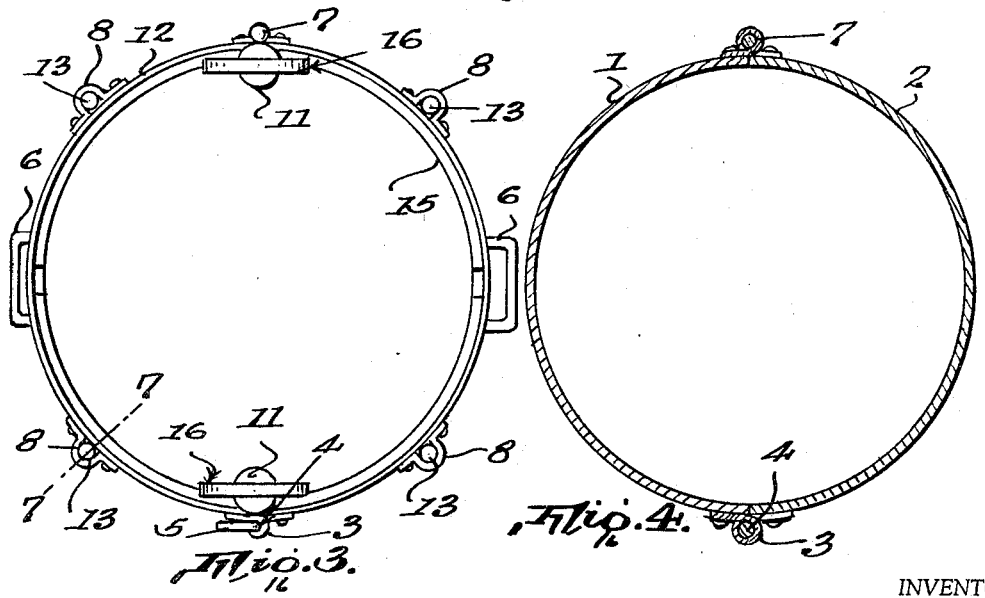
INVENTOR
EDWIN A. WENDLANDT,
By Shoemaker and Mattare
ATTORNEYS.

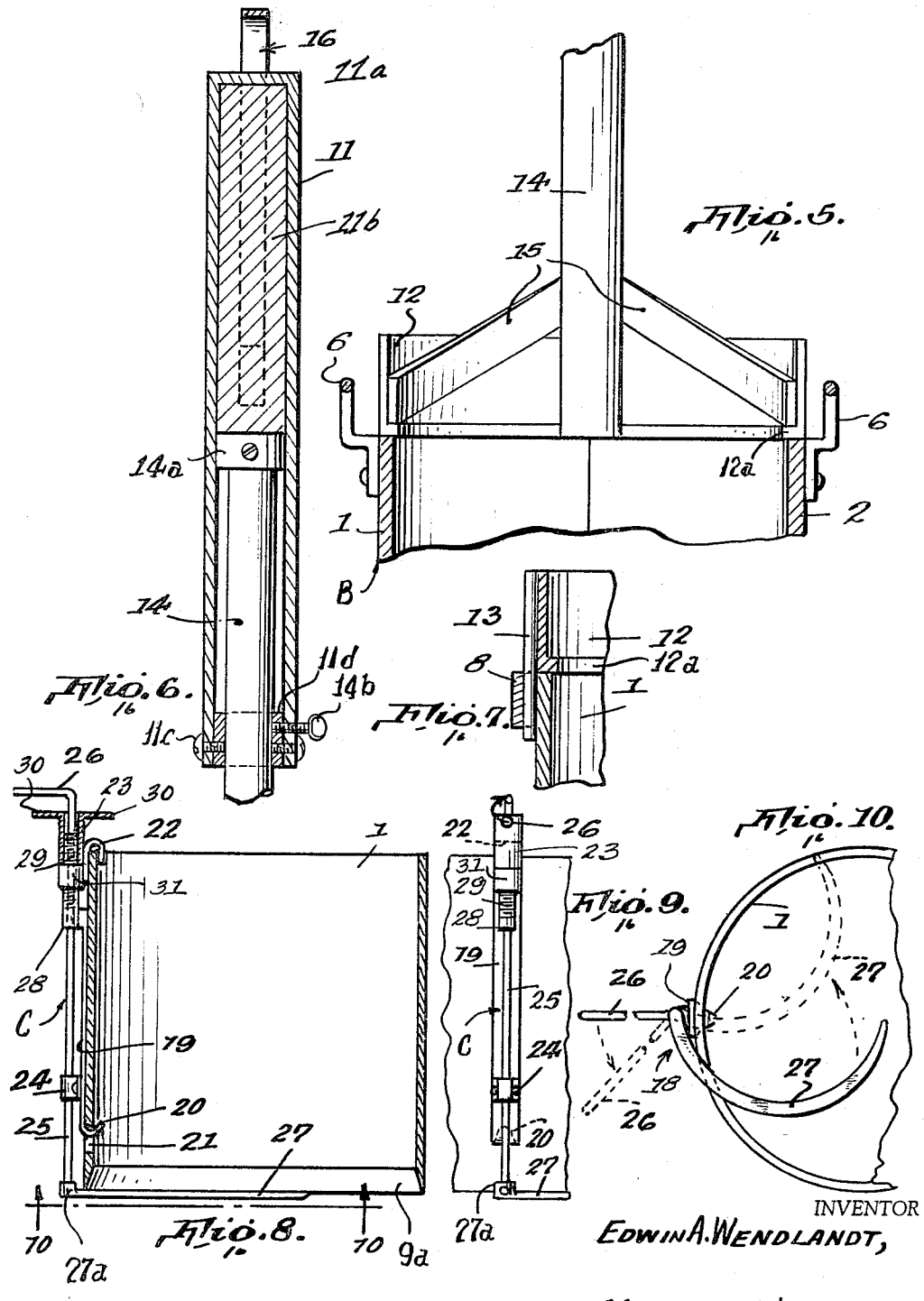

United States Patent Office 3,284,932
Patented Nov. 15, 1966

3,284,932
SHRUB AND TREE BALLING AND TRANSPLANTING IMPLEMENT
Edwin A. Wendlandt, P.O. Box 184, Randolph, Wis.
Filed Dec. 7, 1964, Ser. No. 416,209
11 Claims. (Cl. 37—2)

This invention relates generally to the class of plant husbandry and is directed particularly to an improved shrub and tree balling and transplanting implement.

An object of the present invention is to provide a new and efficient implement for removing a plant from the ground and for retaining a mass or ball of soil around the roots of the plant to facilitate transporting and transplanting the same.

The implement constituting the present invention is designed to be used in the lifting and transplanting of shrubs and trees and for maintaining intact the earth in which the roots of the plant developed and grew whereby all danger of the roots becoming exposed to the air and drying out, with the resultant possible death of the plant, is eliminated.

Heretofore the extensively, employed practice in connection with the transplanting of shrubs and trees has been to dig away the soil from around the root system of the plant, leaving some of the soil adhering to the roots, and then lifting the plant and subsequently covering the ball of earth surrounding the roots with burlap and moving the plant with the adhering earth to a new location. This method, which is extensively used, requires the expenditure of much time and labor and could result in undesirable exposure of the roots particularly if the soil falls away therefrom before the burlap wrapping can be applied.

A particular object of the persent invention is, in view of the foregoing, to provide an improved means of raising and transplanting shrubs and trees, in the from of an encasing implement which can be forced into the ground around the plant root system and by means of which the earth enclosed by the implement together with the plant roots can be readily lifted and transported and the casing structure of the implement is adapted to be forced into the soil by means carried on the casing and designed for manual actuation.

Another object of the invention is to provide an implement of the character described wherein the body of the implement is designed to have attached to the top thereof, a driving means in the form of a pair of units mounted upon the top of the implement body and each of which units embodies a vertically reciprocable weighted member by means of which pounding or driving blows can be applied to the top of the implement body.

A still further object of the invention is to provide an implement of the character described in combination with a root cutter unit which may be applied to the body of the implement after the latter has been driven to the desired extent into the earth and a portion of the earth has been removed from the outer side of the body of the implement, the cutter unit when so applied to the body of the implement having a cutting blade which can be swung across the body of the implement body so as to sever lower end portions of the roots from the main root system.

It is also an object of the invention to provide an implement of the character stated wherein the root system enclosing body portion is designed in such a manner that when it is forced into the earth around the plant and the roots thereof, the earth will be compacted in such a way that it can be readily lifted and will not escape from the implement but can be easily and quickly released when desired when the plant has been placed in its new location.

The invention will be best understood from a consideration of the following detailed description taken in connection with the accompanying drawings with the understanding, however, that the invention is not confined to a strict conformity with the showing of the drawings, but may be changed or modified so long as such changes and modifications mark no material departure from the salient features of the invention as defined by the appended claims.

In the drawings:

FIGURE 1 illustrates the transplanting implement of the present invention, the same being shown in side elevation and partly embedded or extending into the earth.

FIGURE 2 is a vertical section through the body of the implement showing the same in the earth and with the driving means and root cutting unit removed.

FIGURE 3 is a top plan view of the body of the implement and of the driving means thereon.

FIGURE 4 is a horizontal transverse section taken substantially on the line 4—4 of FIGURE 1 through the implement body only.

FIGURE 5 is a vertical section through the upper portion of the implement body and showing the lower portion of one of the two units forming the driving means.

FIGURE 6 is a vertical section, on an enlarged scale, taken substantially on the line 6—6 of FIGURE 1 through the tubular impact member only and showing in elevation a portion of the supporting shaft.

FIGURE 7 is a sectional detail taken substantially on the line 7—7 of FIGURE 3.

FIGURE 8 is a vertical section through the body of the implement showing the root cutter unit applied thereto.

FIGURE 9 is a view in elevation of a portion of the implement body showing the root cutter unit applied thereto.

FIGURE 10 is a view of a portion of the structure as illustrated in FIGURE 8 looking upwardly from the plane of section designated 10—10.

Referring now more particularly to the drawings, the transplanting implement will be seen to comprise three main structures which are the body B, the driving means comprising the two cooperative parts D which are operated as a unit on the body B, and the root cutter unit, generally designated C which, for use, is mounted on the body.

The body B is illustrated as a cylinder comprising two semi-circular sections 1 and 2 which have vertical edges in opposed abutting relation as shown in FIGURE 4 when the body is prepared for extension into the earth.

Each of the two sections carries on its outer side along its two longitudinal edges, the spaced aligned hinge knuckles or eyes 3 which are interengaged as shown in FIGURE 1 to receive the pivot pin or pintle 4, the top end of which is formed to provide the handle 5.

These pins 4 lock the two semi-circular sections together in edge to edge relation as shown but may be readily withdrawn so as to separate the two sections or, if desired, merely by withdrawing one of the pins the two sections can be swung apart, utilizing the other pin as an element of a hinge joint.

To facilitate handling of the body, particularly when it is carrying a mass of earth and a plant, each of the two sections has secured to the outer side thereof and adjacent to its top, a handle 6. These handles are placed in the middle of the respective section so that they will be diametrically opposite when the sections are coupled together, as shown in FIGURE 3.

In addition to the handles 6, each of the sections has secured to the outer side thereof and adjacent to its top edge, a pair of vertically disposed guides 8. These are provided to receive coupling pins of the hereinafter described units of the driving means. Also, as shown in FIGURE 3, these pin receiving guides are located at opposite sides of the handles and, when the sections are coupled together, the guides will be equidistantly spaced around the cylindrical body.

To facilitate the driving of the body into the earth, the bottom edge thereof is sharpened as indicated at 9. This sharpened edge, of course, extends throughout the circular extent of the bottom of each of the sections and when the sections are placed together it forms a continuous unbroken cutting edge. Also, as shown most clearly in FIGURE 2, the cutting edge is formed by beveling the body sections entirely on the inner side whereby there is provided the illustrated inwardly inclined face 9a. This inwardly inclined face or surface thus functions, when the body is forced into the earth, to compress the earth toward the center of the body thereby assuring firm compaction of the earth and preventing it from slipping out of the body when the latter is raised.

If desired, the two sections of the body may be permanently coupled together by one of the pins 4, in which case such pin would have in place of the handle 5, a head as indicated at 7 in FIGURE 3 and the bottom end of the pin could be similarly formed so that the pin would not come out of position or could not be withdrawn.

To facilitate the forcing of the cylinder body B into the earth there is provided a driving means which is mounted upon the top edge of the cylinder body and which is generally designated D. This driving means consists of two units 10 which are secured in cooperative relation upon the top edge of the cylindrical body, which edge is flat, as indicated at 10a to provide a firm supporting surface for the units 10.

Each of the units 10 of the driving means comprises a relatively heavy semi-circular band 12 having an inwardly flanged bottom edge 12a. Each of these semi-circular bands conforms in curvature to the top edge surface 10a of the cylinder body and approximates, in length, somewhat less than half the circular extent of the surface 10a of the body when the semi-circular sections are connected together.

The numeral 14 designates a relatively long post carried by each unit band at approximately midway between its ends. The post 14 at its lower end is secured by welding, or other suitable means, to the inner side of the supporting band and rests, in part, upon the top of the flange 12a.

The numeral 15 designates a pair of bracing arms secured to the lower end of each of the posts 14 and extending therefrom in divergent relation and downwardly toward the inner side of the adjacent band 12, to the flange 12a. The lower ends of these bracing arms are rigidly coupled by welding or other suitable means, to the band and to the flange.

Each of the posts 14 has telescoped thereon from the top end thereof a weighted tubular driver sleeve 11, the top end of which sleeve is closed as indicated at 11a. Fixed within the top end of the sleeve 11 is a body 11b of iron or other heavy material which, when the sleeve is moved upwardly on the post is designed to be manually driven downwardly against the top end of the post in the manner hereinafter described.

The post 14 is of a diameter somewhat less than the inside diameter of the sleeve 11, as illustrated, and carries the head 14a which has an overall diameter approximating the inside diameter of the sleeve 11.

The lower end of the sleeve 11 has fixed therein, by means of screws 11c, the collar 11d, which encircles the post 14 as illustrated and thus functions to prevent the sleeve 11 from being accidentally pulled off of the post when it is raised in the operation of driving.

The numeral 14b designates a locking screw which is threaded through the lower end of the sleeve and through the collar 11d and is adapted to be tightened at its inner end against the post 14 when it is desired to fasten the post and sleeve together to facilitate carrying. This fastening of the post and sleeve together would be done, of course, when the sleeve is slid all of the way down on the post so that the post will be substantially completely housed in the sleeve.

The sleeve 11 carries a handle 16 by means of which it can be raised and lowered on the post. As illustrated in FIGURE 1, this handle comprises a long vertical portion 16a secured at its lower end to the side of the sleeve and maintained in spaced parallel relation with the sleeve and it extends beyond the upper end of the sleeve and joins the horizontal leg 16b which extends across the top of the sleeve and then curves downwardly as indicated at 16c and is fixed at its end to the side of the sleeve opposite from the leg 16a. With this construction it will be seen that an operator can conveniently grasp the two legs of the sleeve with his hands and shift the sleeve upwardly and then drive it down to apply impact against the head end of the post 14.

For fixing the units 10 of the driving means upon the top edge surface 10a of the cylinder body, each of the bands 12 has fixed to its outer side a pair of vertically disposed pins 13 which, as shown in FIGURE 1, project below the bottom edge of the band on which they are mounted. These pins 13 are also spaced apart the same distance as a pair of guides 8 and the projecting lower ends of the pins are formed to be extended downwardly through the guides so as to maintain the unit in position upon the body.

Each unit 10 is placed to extend across opposing edges of the body sections whereby the lower end of the post will be directed toward the joined edges of a pair of sections as will be readily apparent.

The driving means D, embodying the two units 10, is handled or manipulated by two operators or workmen. In the operation of driving the cylindrical body into the earth, the sections are closed around the base portion of a plant such as is skeletally illustrated at S.

The units 10 of the driving means are then mounted upon the top edge of the body and each of two operators or workmen then drives the body into the earth by raising and lowering the driver sleeves on the post, driving the sleeves downwardly with great force so as to pound the weight 11b against the top or head end of the underlying post. This action will, of course, force the sharpened edge of the body into the earth and such edge will also cut its way through the outer ends of roots and rootlets as illustrated in FIGURE 2 and, as previously stated, due to the inwardly inclined surfaces 9a at the bottom edge of the body, the earth will be compressed so that when the body is lifted the earth will remain therein.

The body B may, of course, be made in different sizes with respect to the diameter and length thereof.

After the body has been driven to the desired extent into the earth, the earth and the plant roots are cut through in a plane lying below the cutting edge 9 of the body by means of the cutter unit which is generally designated C. This unit is applied to the body as illustrated in FIGURE 8, after a sufficient amount of earth has been removed from the outer side of the body at the location provided for mounting the unit thereon.

The cutter unit comprises a strap bar 19 which is designed to be positioned vertically against the outer side of the body. The lower end of this bar is turned to form the hook 20 which is adapted to be engaged in the opening 21 in a section, such as the section 1, of the body.

The strap bar 19 has fixed to the outer side thereof adjacent to the hook or the lower end of the bar, a guide bushing 24 and at its upper end the bar 19 has fixed thereto in alignment with the bushing 24, the relatively long guide bushing 28.

Cooperating with the hook 20 at the lower end of the bar 19, is an upper hook member 22, which is formed to be engaged over the top edge of the body section and which is integral with a collar 31 which encircles the bushing 28 and is freely movable on the latter.

The bushing 28 is externally screw threaded as indicated at 29 and extends at its upper end, and above the collar 31, into the draw sleeve 23 which is threadably connected with the threaded bushing 28 by the screw threads 23a formed interiorly thereof and throughout the length thereof.

Means is provided for rotating the draw sleeve such as the arms 30 which may project from opposite sides of the sleeve at the top end thereof as clearly shown in FIGURE 8.

The numeral 25 designates a rotatable shaft which extends vertically through and is freely rotatable in the bushings 24 and 28 and projects from the top end of the bushing above the draw sleeve as shown in FIGURE 8.

Means is provided at the upper end of the rotatable shaft 25 for facilitating the turning or rotation of the latter in the bushings, such means being here shown as a laterally turned upper end portion of the rotatable shaft forming a handle bar 26. This laterally turned upper end portion of the shaft 25 may be formed after the parts of the device are assembled or the handle bar may be constructed as a unit separate from the rotatable shaft and operatively connected with the upper end of the latter in any suitable manner to permit the separation of the shaft and the handle bar if such should be found desirable.

The lower end of the rotatable shaft 25 has fixed thereon the relatively long curved cutting blade 27 which is formed like or similar to a conventional sickle. This cutter blade has an outer end portion formed integrally with a hub 27a in which the lower end of the shaft 25 is set and the hub and the end of the shaft therein are rigidly coupled or joined together either by welding or by means of a pin or screw passing transversely through the hub and through the shaft, as illustrated.

The overall length of the cutter blade 27 is such that it will reach beyond the center of the cylindrical body when it is swung, by rotating the shaft 25, in a plane below and parallel with the bottom end of the body.

While the blade has been illustrated in FIGURE 10 as extending only slightly beyond the vertical center of the body, it may, obviously, be made of a length to extend entirely across the width of the body if desired.

In the use of the transplanting device, the sections are, of course, separated either completely or by turning them upon one of the hinge pins to facilitate positioning the body around the bottom part of a plant or tree as previously stated. After the sections are then closed or brought together and secured one to the other the body is driven into the ground as previously stated by manipulating the weighted driver sleeves 11 to apply the pounding forces against the top edge of the body at opposite sides thereof.

After the body has been driven into the earth to the desired or necessary extent, it may be found necessary to sever any plant roots which project beyond the bottom end of the body so as to facilitate the removal of the body and the ball of earth and plant as a single mass. This separation of the root system below the body is then, of course, accomplished by manipulating the cutter unit and in order to place the latter in operative position the earth is removed along a portion of the outer side of the body in a sufficient amount to permit the placing of the cutter unit in position and engagement of the hook end 20 of the bar 19 in the aperture 21.

The draw sleeve is then threaded outwardly or upwardly on the end of the threaded bushing 28 to a sufficient extent to permit the hook 22 of the collar 31 to be engaged over the top edge of the body after which the draw sleeve is reversely rotated to thread it downwardly until its lower end bears against the top edge of the collar 31 whereupon further rotation of the sleeve will force or draw the collar downwardly and secure the cutter unit to the body by drawing the hooks 20 and 22 together as will be obvious.

In removing the earth to facilitate use of the cutter unit it will, of course, be obvious that a sufficient amount is removed from the area of the bottom of the body to permit the cutter blade 27 to be placed in position outside of the circular area defined by the body. After the blade has been fixed in position in the manner described, the shaft 25 is turned so as to force the cutter blade in a sweeping arc across the underside of the body so as to sever the roots below the body, particularly the central or tap root, whereupon suitable lifting means may be attached to the handles 6, or they may be grasped by the hands of the workmen where the tree or plant is of small size, and the entire body and the contained earth and tree roots can be lifted and transported to a desired new location.

In cases where the tree or plant is relatively small in size or where there is no central root to be cut, the use of the cutter unit may not be required for the removal of the plant.

After the units 10, making up the driving means, are removed, the handling of the same may be made more convenient by sliding the post 14 as far as it will go into the driver sleeve 11 and securing it in position by threading the screw 14b inwardly until it binds against the side of the post so that the parts thus become locked together.

While reference has been made above to the operation of the device by more than one workman, that is, the workmen grasping each of the handles, the device may be operated by a single workman alternately raising and lowering the weighted driver sleeves, as will be readily apparent, particularly with regard to a relatively small apparatus construction.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A shrub and tree balling and transplanting implement, comprising an elongate, tubular body having open top and bottom ends and divided longitudinally into sections, means coupling said sections together for ready separation thereof, the body sections having sharp bottom edges for facilitating forcing the body into the earth in encasing relation to a plant, a driving means, means coupling said driving means with the top of the body, a root cutter mechanism, and means for removably mounting said mechanism on the side of said body for operation in a plane across the bottom end of the body and about an axis substantially parallel to said tubular body and means for securing said mounting means including an operator extending from the top of said body for engaging or disengaging said mounting means from said body.

2. The invention as defined by claim 1, with means for mounting said driving means upon the top of the body, for operation.

3. The invention as defined by claim 1, wherein said driving means is an impact means adapted to deliver driving force to the top edges of said section.

4. A shrub and tree balling and transplanting implement, comprising a straight elongate tubular body having top and bottom ends and divided longitudinally in sections, means separably coupling the sections together, said body sections having sharp bottom edges, driving means for forcing said edges of the coupled sections into the earth in encasing relation to a plant, said driving means embodying a base part and a vertically reciprocable driver on the base part, and means maintaining the base part of the driving means upon the top end of a section.

5. The invention as defined by claim 4, wherein the said driving means base part is in the form of an elongate body having a shape conforming to the edge configuration of the top end of the section on which it is maintained and said driver is positioned on the base part to deliver driving force downwardly thereagainst.

6. A shrub and tree balling and transplanting implement, comprising a straight elongate tubular body having top and bottom ends and divided longitudinally in sections, means separably coupling the sections together, said body sections having sharp bottom edges, and having flat top edges, driving means for forcing said sharp edges of the coupled sections into the earth in encasing relation to a plant, said driving means comprising at least two units each embodying an elongate base part shaped to conform to the flat top edge configuration of a section and resting on such edge and a vertical driver embodying an elongate shaft supported on the base part and extending into a weighted tubular impact member vertically reciprocable thereon.

7. The invention as defined by claim 6, wherein the weighting of said impact member consists of a massive body fixed in the upper part of the said member to deliver a blow to the top end of the shaft.

8. The invention as defined by claim 4, with a root cutter means comprising an elongate member, means for securing the latter vertically upon the outer side of the tubular body, aligned bearing bushings carried by said member, a shaft extending through and rotatable in said bushings, means carried by the shaft for facilitating rotation thereof, and an elongate cutter blade secured to the lower end of said shaft in a position to be moved across the bottom end of the tubular body by rotation of the shaft.

9. The invention as defined by claim 4, with a root cutter means comprising an elongate bar having a lower end formed to provide an upturned hook, an elongate bearing bushing extending in offset parallel relation with and from the upper end of said bar, said bushing being exteriorly screw threaded, a second bushing carried by the bar adjacent to the lower end thereof in alignment with the first bushing, a sliding bushing freely slidable on the first bushing and carrying a downturned hook for engagement over the top edge of the tubular body, said tubular body having an aperture therein adjacent to the bottom edge thereof to receive the hook carried by said bar, an elongate shaft carried by and rotatable in the aligned first and second bushings and having an upper end and a lower end, an elongate cutter secured at one end to the lower end of said shaft and extending therefrom in a plane substantially perpendicular thereto, said cutter means being mounted on the tubular body by having the hook of said bar engaged in the aperture of the body and having the hook of the sliding bushing engaged over the top edge of the body, said shaft being of a length to extend a substantial distance beyond the upper end of the first bushing when the cutter means is mounted on the body, means carried by the upper end of the shaft for turning the shaft to swing said cutter in a plane across the bottom edge of the tubular body, and means threaded upon the upper end of said elongate bearing bushing for effecting the drawing together of said hooks.

10. The invention as defined by claim 9, wherein said cutter is in the form of a sickle and is of a length to extend at its free end beyond the longitudinal center of the tubular body when the cutter means is secured thereon.

11. A shrub and tree balling and transplanting implement, comprising an elongate, tubular body having open top and bottom ends and divided longitudinally into sections, means coupling said sections together for ready separation thereof, the body sections having sharp bottom edges for facilitating forcing the body into the earth in encasing relation to a plant, said sharp bottom edges being formed by a wide, upwardly and inwardly sloping bevel for urging earth inwardly and compressing it in the body as the latter is forced into the earth, a driving means, means coupling said driving means with the top of the body, a root cutter mechanism, and means for removably mounting said mechanism on the side of said body for operation in a plane across the bottom end of the body and about an axis substantially parallel to said tubular body, and means for securing said mounting means including an operator extending from the top of said body for engaging or disengaging said mounting means from said body.

References Cited by the Examiner
UNITED STATES PATENTS

| | | | |
|---|---|---|---|
| 1,162,126 | 11/1915 | Bates | 294—50.7 |
| 1,775,142 | 9/1930 | Sandorn | 294—50.7 X |
| 2,863,258 | 12/1958 | Gish | 294—50.7 X |
| 2,989,335 | 6/1961 | North | 294—50.7 |

GERALD M. FORLENZA, *Primary Examiner.*

G. F. ABRAHAM, *Assistant Examiner.*